(12) United States Patent
Divakaran et al.

(10) Patent No.: US 6,618,507 B1
(45) Date of Patent: Sep. 9, 2003

(54) METHODS OF FEATURE EXTRACTION OF VIDEO SEQUENCES

(75) Inventors: Ajay Divakaran, Scotch Plains, NJ (US); Huifang Sun, Cranbury, NJ (US); Hiroshi Ito, Fort Lee, NJ (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 0 days.

(21) Appl. No.: 09/236,838

(22) Filed: Jan. 25, 1999

(51) Int. Cl.$^7$ ............................. G06K 9/46; G06K 9/36
(52) U.S. Cl. ....................................... 382/236; 382/245
(58) Field of Search ................................ 382/236, 235, 382/250, 248, 298, 233; 348/387, 390, 395, 397, 403, 411

(56) References Cited

U.S. PATENT DOCUMENTS

| | | | | |
|---|---|---|---|---|
| 5,629,736 A | * | 5/1997 | Haskell et al. ............... | 348/387 |
| 5,687,095 A | * | 11/1997 | Haskell et al. ............... | 348/387 |
| 5,832,120 A | * | 11/1998 | Prabhakar et al. ........... | 382/233 |
| 5,870,146 A | * | 2/1999 | Zhu ............................ | 348/409 |
| 6,108,448 A | * | 8/2000 | Song et al. .................. | 382/235 |

OTHER PUBLICATIONS

Feng et al.; "Scene Change Detection Algorithm for MPEG Video Sequences"; Proceedings of the International Conference on Image Processing, Sep. 1996, pp. 821–824.

Won et al.; "Extracting Image Features from MPEG–2 Compressed Stream"; Proceedings of the SPIE, Jan. 1998, pp. 426–435.

Kobla, et al.; "Extraction of Features for Indexing MPEG–Compressed Video"; IEEE First Workshop on Multimedia Signal Processing, Proceedings of the First Signal Processing Society Workshop on Multimedia Signal Progressing, Jun., 1997. Pp. 337–342.

Kobla, et al.; "Indexing and Retrieval of the MPEG Compressed Video"; Journal of Electronic Imaging. vol. 7, No. 2. Apr., 1998. Pp. 294–307.

* cited by examiner

Primary Examiner—Andrew W. Johns
Assistant Examiner—Duy M. Dang
(74) Attorney, Agent, or Firm—Dirk Brinkman; Andrew Curtin (57) ABSTRACT

This invention relates to methods of feature extraction from MPEG-2 and MPEG-4 compressed video sequences. The spatio-temporal compression complexity of video sequences is evaluated for feature extraction by inspecting the compressed bitstream and the complexity is used as a descriptor of the spatio-temporal characteristics of the video sequence. The spatio-temporal compression complexity measure is used as a matching criterion and can also be used for absolute indexing. Feature extraction can be accomplished in conjunction with scene change detection techniques and the combination has reasonable accuracy and the advantage of high simplicity since it is based on entropy decoding of signals in compressed form and does not require computationally expensive inverse Discrete Cosine Transformation (DCT).

23 Claims, 2 Drawing Sheets

MPEG-4 Compressed Video Sequences
Frame Size QCIF (176x144)
Frame Rate 30 frames/sec
Compression Rate 1-1.2 Mbps

| Sequence | Object | VOP Size in MB's | $C_{mv}^{avg}$ | $C_{res}^{avg}$ | QP | $N_0$ | Most common run-length range | Frequency of most common run-length range |
|---|---|---|---|---|---|---|---|---|
| News | Still Background | 11x9 | 0.2 | 2.28 | 3 | 89 | Long | 3 |
| News | TV Monitor with Dancer Sequence | 6x5 | 11.43 | 193.5 | 3 | 18 | Short | 3 |
| News | Newsreaders | 11x7 | 1.1 | 42.19 | 3 | 30 | Short | 4 |
| News | Text Overlay | 3x2 | 0.0 | 0.0 | 3 | 6 | Long | 1 |
| Coast-guard (CG) | Water | 11x6 | 5.48 | 41.5 | 3 | 51 | Long | 4 |
| CG | Motor Launch | 9x5 | 2.00 | 35.6 | 3 | 23 | Long | 2 |
| CG | Small Motorboat and Wake | 11x1 | 4.00 | 63.8 | 3 | 8 | Long | 3 |
| CG | Panned Background | 11x4 | 2.86 | 51.0 | 3 | 36 | Medium | 4 |
| Container Ship (CS) | Water | 11x8 | 0.85 | 5.46 | 6 | 58 | Short | 10 |
| CS | Ship | 9x4 | 1.16 | 46.13 | 6 | 15 | Long | 4 |
| CS | Small Boat | 4x1 | 0.8 | 16.4 | 6 | 3 | Long | 1 |
| CS | Foreground (Flagpole) | 11x9 | 0.12 | 1.79 | 6 | 90 | Long | 4 |
| CS | Still Bgd. (Sky) | 11x3 | 0.4 | 2.09 | 6 | 29 | Long | 2 |
| CS | Flag | 1x1 | 2 | 97 | 6 | 0 | N/A | 0 |
| Akiyo | Still Background | 11x9 | 0.22 | 2.93 | 4 | 89 | Long | 3 |
| Akiyo | Head and Shoulders | 9x8 | 1.77 | 35.3 | 4 | 37 | Short | 5 |

Figure 1: Proposed Descriptors for Various MPEG-4 Objects

METHODS OF FEATURE EXTRACTION OF VIDEO SEQUENCES

BACKGROUND OF THE INVENTION

1. Field of the Invention

This invention relates to methods of feature extraction, preferably in combination with scene change detection for video signal sequences of the types encountered in, for example, High Definition Television (HDTV) broadcast signals or other compressed forms of video information such as might be encountered on the world wide web communications medium.

2. Description of the Prior Art

Basic methods for compressing the bandwidth of digital color video signals have been adopted by the Motion Picture Experts Group (MPEG).

The MPEG standards achieve high data compression rates by developing information for a full frame of the image only every so often. The full image frames, or intra-coded pictures are called "I-frames", and contain full frame information independent of any other frames. B-frames and P-frames are encoded between the I-frames and store only image differences with respect to the reference anchor frames.

Typically, each frame of a video sequence is partitioned into smaller blocks of pixel data and each block is subjected to a discrete cosine transformation (DCT) function to convert the statistically dependent spatial domain picture elements (pixels) into independent frequency domain DCT coefficients.

Respective 8×8 blocks of pixels are subjected to the Discrete Cosine Transform (DCT) to provide the coded signal. The resulting coefficients typically are subjected to adaptive quantization, and then are run-length and variable-length encoded. Thus, the blocks of transmitted data typically include fewer than an 8×8 matrix of codewords. Macroblocks of intraframe encoded data (I-frames) will also include information such as the level of quantization employed, a macroblock address or location indicator, and a macroblock type, the latter information being referred to as "header" or "overhead" information.

The blocks of data encoded according to P or B interframe coding also consist of matrices of Discrete Cosine Coefficients. In this instance, however, the coefficients represent residues or differences between a predicted 8×8 pixel matrix and the actual 8×8 pixel matrix. These coefficients also are subjected to quantization and run- and variable-length coding. In the frame sequence, I and P frames are designated anchor frames. Each P frame is predicted from the lastmost occurring anchor frame. Each B frame is predicted from one or both of the anchor frames between which it is disposed. The predictive coding process involves generating displacement vectors, which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As with intraframe coded frames, the macroblocks include quantization, address and type information.

The results are usually energy concentrated so that only a few of the coefficients in a block contain the main part of the picture information. The coefficients are quantized in a known manner to effectively limit the dynamic range of ones of the coefficients and the results are then run-length and variable-length encoded for application to a transmission medium.

The so-called MPEG-4 format is described in "MPEG-4 Video Verification Model Version 5.0", distributed by the Adhoc Group on MPEG-4 Video VM Editing to its members under the designation ISO/IEC JTCI/SC29/WG11 MPEG 96/N1469, November 1996. The MPEG-4 video coding format produces a variable bit rate stream at the encoder from frame to frame (as was the case with prior schemes). Since the variable bit rate stream is transmitted over a fixed rate channel, a channel buffer is employed to smooth out the bit stream. In order to prevent the buffer from overflowing or underflowing, rate control of the encoding process is employed.

With the advent of new digital video services, such as video distribution on the world wide web, there is an increasing need for signal processing techniques for identifying and extracting information regarding features of the video sequences. Identification of scene changes, whether they are abrupt or gradual, are useful for the purposes of indexing image changes and thereafter, scenes may be analyzed automatically to determine certain features or characteristics of the particular material.

In the future, it should be expected that a significant amount of digital video material will be provided in the form of compressed or coded data as described above. Operating on the video sequence information in its compressed form, rather than its decompressed or decoded form, where possible, usually permits more rapid processing because of the reduction in data size. It is advantageous to develop methods and techniques which permit operating directly on compressed data, rather than having to perform full frame decompression before other processing is performed.

It has also been known that when a block (macroblock) contains an edge boundary of an object, the energy in that block after transformation, as represented by the DCT coefficients, includes a relatively large DC coefficient (top left corner of matrix) and randomly distributed AC coefficients throughout the matrix. A non-edge block, on the other hand, usually is characterized by a similar large DC coefficient (top left corner) and a few (e.g. two) adjacent AC coefficients which are substantially larger than other coefficients associated with that block. This information relates to image changes in the spatial domain and, when combined with image difference information obtained from comparing successive frames (i.e. temporal differences) factors are available for distinguishing one video object (VO) from another. Use of DC values of macroblocks of an image result in a blurred version of the original image which retains much of the content of the original.

Thus, previous work in feature extraction for indexing from compressed video had mostly emphasized DC coefficient extraction. In a paper entitled "Rapid Scene Analysis on Compressed Video", IEEE Transactions on Circuits and Systems for Video Technology, Vol. 5, No. 6, Dec. 1995, page 533–544, Yeo and Liu describe an approach to scene change detection in the MPEG-2 compressed video domain, as well as review earlier efforts at detecting scene changes based on sequences of entire (uncompressed) image data, and various compressed video processing techniques of others. Yeo and Liu introduced the use of spatially reduced versions of the original images, so-called DC images, and DC sequences extracted from compressed video to facilitate scene analysis operations. Their "DC image" is made up of pixels which are the average value of the pixels in a block of the original image and the DC sequence is the combination of the resulting reduced number of pixels of the DC image.

Won et al, in a paper published in Proc. SPE Conf. on Storage and Retrieval for Image and Video Databases, January 1998, describe a method to extract features from compressed MPEG-2 video by making use of the bits expended on the DC coefficients to locate edges in the frames. However, their work is limited to I-frames only. Kobla et al describe a method in the same Proceedings using the DC image extraction of Yeo et al to form video trails that characterize the video clips. Feng et al (IEEE International Conference on Image Processing, Vol. 11, pp. 821–824, Sep. 16–19, 1996), use the bit allocation across the macroblocks of MPEG-2 frames to detect abrupt scene changes, without extracting DC images. Feng et al's technique is computationally the simplest since it does not require significant computation in addition to that required for parsing the compressed bitstream.

In accordance with inventions of the present inventors and a co-worker, which are described in recently filed, commonly owned applications, computationally simple methods have been devised which employ combinations of certain aspects of Feng et al's approach and Yeo et al's approach to give accurate and simple scene change detection. Advantageously, techniques that make use of bit allocation information in accordance with the methods of the present invention are employed, preferably in accordance with the scene change detection techniques, to extract feature information.

It should be noted that the DC image extraction based technique is good for I-frames since the extraction of the DC values from I-frames is relatively simple. However, for P-frames, additional computation is needed.

It has been determined that, once a suspected scene/object change has been accurately located in a group of consecutive frames/objects by use of a DC image extraction based technique, application of an appropriate bit allocation-based technique and/or an appropriate DC residual coefficient processing techniques to P-frame information in the vicinity of the suspected scene information quickly and accurately locates the cut point. This combined method is applicable to either MPEG-2 sequences or MPEG-4 multiple object sequences. In the MPEG-4 case, it has been found to be advantageous to use a weighted sum of the changes in each object of the frame, using the area of each object as the weighing factor.

STATEMENT OF THE INVENTION AND DESCRIPTION OF PREFERRED EMBODIMENT

In accordance with one aspect of the current method, and preferably following the identification of scene changes as outlined above, the allocations of bits for motion and bits for the residual across the frame are used to form a "descriptor" for a frame in the MPEG-2 case and for an object in the MPEG-4 case. A descriptor is then formed for the video sequence from the frame signatures. This descriptor for a video sequence lends itself well to matching, classification and searching. It is anticipated that this descriptor will find particular application in connection with the relatively recent MPEG-7 proposals.

Figure 2:
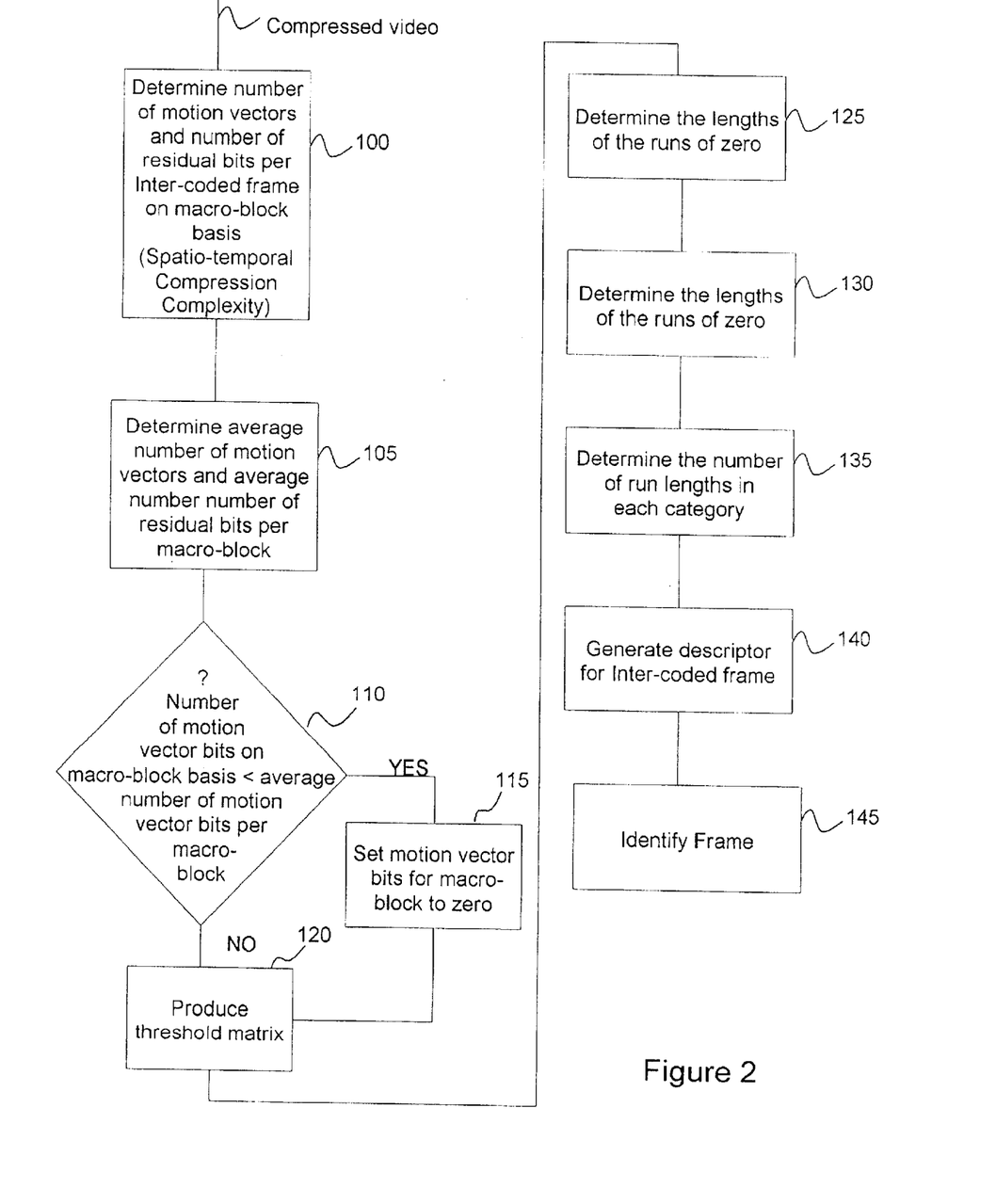
FIG. 2 is a flow chart of a preferred embodiment of the invention.

In particular as shown in FIG. 2, a method of extracting features from digital image-representative video data in compressed form which comprises at least I-frame data and P-frame data, the P-frame data comprising residual difference data and motion vector data referenced to temporally adjacent I-frame data, the combination of the I-frame data and the P-frame data representing a frame by frame sequence of images constituting a video shot of at least one object, the method comprises the steps of constructing a motion compression complexity matrix (CCM) for at least each P-frame of data as indicated by step 100. The motion CCM comprises a first set of numerical values, each representing the number of bits required to encode a motion vector for a corresponding macroblock of at least one object in the corresponding frame. The method further comprises constructing a residual compression complexity matrix (CCM) for at least each P-frame of data, the residual CCM comprising a second set of numerical values, each representing the number of bits required to encode a residual difference for a corresponding macroblock of the at least one object in the corresponding frame. This is followed by determining in step 105, for each motion CCM, the average number of bits spent on encoding motion vectors per macroblock, $C^{avg}_{mv}$ and then determining, for each residual CCM, the average number of bits spent on encoding residual differences per macroblock, $C^{avg}_{res}$. Thereafter the steps comprise comparing in step 110, for each motion CCM, the average number of bits spent on encoding motion vectors per macroblock for the motion CCM with each of the values in the motion CCM and, in step 115, reducing to zero all the values less than the corresponding average to produce, in step 120, a corresponding thresholded motion CCM. The method further comprises determining in step 125, for each thresholded motion CCM, the run-lengths of zeroes in each thresholded motion CCM, and summing each of the run-lengths of zeros to determine the total number of zeroes, $N_o$, corresponding to each of the thresholded motion CCM's . Thereafter, classifying, in step 130, each of the run-lengths of zeros into categories of short run length, medium run-length and long run-length and determine in step 135, for each thresholded motion CCM, the number of members in each category $N_{sr}$, $N_{mr}$, $N_{lr}$. In this way, for each of the at least one object portion of a corresponding frame, the parameters $C^{avg}_{mv}$, $C^{avg}_{res}$, $N_o$, $N_{sr}$, $N_{mr}$, $N_{lr}$ comprise a descriptor for features, as indicated by step 140.

Feature Extraction from Motion and Residual Bit Allocation Profiles.

MPEG-2 and MPEG-4 video "inter" compression essentially consists of block-matching-based motion compensation followed by DCT encoding of the residual. The residual is a convenient measure of the difference between the current frame and the previous frame. Motion vectors provide an indication of the motion characteristics of a scene. The motion vectors and the residual data together indicate the spatio-temporal compression complexity of a video sequence. Furthermore, since larger motion vectors take more bits to encode (as do larger residuals for the same quantization step-size), the number of bits expended on motion vectors and residuals directly indicates the spatio-temporal compression complexity of a video sequence. The bit expenditure is readily determined from the compressed bitstreams because it involves only entropy decoding (Variable Length Code parsing) and no inverse DCT as indicated in step 100. The bit expenditures, coupled with quantizer step-size, are readily computed measures of spatio-temporal compression complexity. Note that the spatial distribution of the compression complexity depends on the spatio-temporal characteristics of the video sequence. This spatial distribution of spatio-temporal complexity can be used as a matching criterion for indexing video sequences.

According to a further aspect of the present invention, a bit allocation based descriptor is constructed for each frame. That is, for each object/frame, two "compression complexity matrices" are constructed which comprise, respectively, the number of bits required for encoding the motion vectors and the number of bits required for encoding the residuals of each macroblock in the object/frame.

Thus $C_{mv}=\{R_{mv}(i,j)\}$ and $C_{res}=\{(R_{re}(i,j)\}$ are the rate matrices corresponding to the motion vectors and the residuals, respectively. The Quantization Parameter Q P for each of the blocks is also stored in a matrix Q.

For simplicity, if only P frames/objects are considered, the bit allocation based descriptor for a frame is constructed according to the following steps.

1. If a macroblock of the P-frame is encoded as an Intra Block, then its motion vector bit expenditure is set to zero and its residual bit expenditure is set to the bits spent on the intra coding. This is done because intra-coding can be interpreted as producing an all zero block as a result of the motion compensation, followed by coding of the difference (residue) between the all zero block and the block being encoded.
2. Although the motion vector bit expenditure is not directly affected by quantizer step size, the quantizer step size affects the residual bit expenditure directly. Therefore, the quantization step size value is included as part of the descriptor. This value may be different for each macroblock, in which case a quantizer value for each block/row would be included as part of the descriptor, for example, in the form of a matrix.
3. The average number of bits spent on motion vectors per macroblock $C_{mv}^{avg}$ of the frame/object can be calculated from $C_{mv}$ as indicated in step 105. That is, where M and N are measured in numbers of 16×16 macroblocks (e.g. for a QCIF 176×144 object, M (width)=11 and N (height)=9), the values of the average number of bits spent on motion vectors per macroblock in the object may be calculated by summing the values of the number of bits for every one of the motion vectors associated with the 99 macroblocks and dividing that sum by 99.
4. This average is a highly useful measure of the motion complexity of the object/frame. It is used as a first matching criterion that will eliminate from consideration objects/frames that are considerably more or less motion-intensive than the target object/frame. For example, in an MPEG video compression system, this criterion facilitates easy distinction between still and moving objects.
5. Similarly, calculate the average compression complexity of the residual per macroblock $C_{res}^{avg}$ for each frame/object. This number also helps to classify or match object/frames.
6. Determine the maximum number of bits spent per macroblock and the minimum number of bits spent per macroblock for motion in each object/frame.
7. Compute "run-length" attributes of the motion vector rate matrix as follows.
   (a) Compare each element of the motion vector rate matrix to a threshold value of the average number of bits spent on motion vectors per macroblock (see "3" above). A motion vector threshold matrix $C_{mv}^{thresh}(i,j)$, is formed where each element of the motion vector rate matrix which is less than the threshold is set to zero and each element equal to or greater than the threshold is entered in the matrix as is. The threshold is supplied as part of the descriptor as indicated in steps 110, 115 and 120.
   (b) The run-lengths of zeroes in the motion vector threshold matrix are determined in step 125. The total number of zeros $N_o$ is determined by summing all the run-lengths. The run-lengths are then classified into three categories—short, medium and long in step 130. For QCIF images, it has been found to be suitable to define short as less than 6% of the total number of macroblocks in the object/frame, medium as up to about 9–10% and long as above the upper limit of medium (e.g. 10%) for these purposes. These percentage ranges can also be applied in other cases but experience may dictate otherwise. The number of elements in each of the three categories, i.e., $N_{sr}$, $N_{mr}$, and $N_{lr}$ are determined in step 135. These numbers are used as the run-length features for matching. The reasoning for using these three different levels as categories is to prevent translated or mirror reflected versions of the same frame from producing radically different descriptors. Moreover, this categorization simplifies calculations and helps to compare objects or frames of different sizes.

Some examples of familiar scenes with mostly short runs are head and shoulder sequences, while frames with mostly long runs include still or very slowly moving object sequences, or frames with concentrated high action. Frames with a combination of slow and fast moving objects have been observed to have mostly medium length runs.

7. The descriptor structure thus consists of $$C_{mv}^{avg}, C_{mv}, N_o, N_{sr}, N_{mr}, N_{lr}, C_{resavg}, C_{res}, Q$$

in addition to the compression format, compression rate, frame size and frame rate. A descriptor is thereby developed for each frame of a sequence in step 140.

A descriptor for a shot is determined by the following steps:
1. First, segment the video sequence temporally into shots, using the existing scene change detection techniques described above, and more fully, in the noted co-pending applications.
2. Find the ground of frames lying in the most common range of (closest to) $C_{mv}^{avg}$, the average bit expenditure on motion vectors per macroblock, over the entire shot. A frame is chosen from that group at random and its descriptor is used as the descriptor for the entire shot.

The above-described descriptor can be used in step 145 for matching to similar shots. That is, as a first pass at matching, a first list of potential matches within a group of shots can be made on the basis of having similar (i.e. within some numerical range) average bit expenditure on motion vectors per macroblock.

Then, the sum of all of the run lengths $N_o$ in each descriptor is used as a second pass to further rank all of the candidates from the first pass for a potential match. Alternatively, the category of most frequent run-length is inspected for matches. If two candidate shots have the same value for most frequent run length, then the frequency of that run length may be used to provide a ranking for good matches. If the shots do not have the same value for the most common run length category, that pair would be placed in an "inferior" match category. The inferior match category normally would not be ranked any further.

The application of the foregoing techniques to well-known test images(sequences) is useful for an understanding of the nature of descriptors which can be obtained and the analysis which can be performed. To that end, the sequence "Akiyo" has been analyzed. The matrix representing motion bit expenditure associated with the "background" object (Object No.0) of the "Akiyo" sequence, made up of an 11×9 array of macroblocks, each macroblock consisting of 16×16 array of pixels, would appear as shown below Motion Bit Expenditure
Akiyo: (10 Frames per Second) Object Number 0
Size 11 x 9 in macroblocks
(Macroblock size 16 x 16) (Background)

```
0 0 0 0 0 0 0 0 0 0 0
0 0 0 0 0 0 0 0 0 0 0
0 0 0 0 0 0 0 0 0 0 0
0 0 0 0 0 0 0 2 0 0 0
0 0 0 0 0 0 0 0 0 0 0
0 0 0 2 0 0 0 7 6 0 0
0 0 4 0 0 0 0 0 0 8 0
0 2 0 0 0 0 0 0 0 0 0
0 0 0 0 0 0 0 0 0 0 0
```

As would be expected for a "background" object, the complexity of the motion information is low. The average number of bits per macroblock (99 macroblocks) is 0.31.

The output matrix obtained in this case after thresholding would be the same as the input matrix since the threshold value (0.31) is so low. A run length representation of the object, scanning from upper left to lower right, would appear as follows.

40 2 17 2 3 70 6 4 4 6 8 2 2 20 (Threshold T=0).

In a similar manner, the motion bit expenditure for "Akiyo's Head and Shoulders" (Object No. 1) which is made up of a 9×8array, would appear as follows.

Object Number 1
size 9 x 8
(Akiyo's head and shoulders)

```
0 0 0 10 21 15 0 0 0
0 0 0  4  2  2 0 0 0
0 0 0 22 16 18 4 0 0
0 0 0 14  2  4 2 0 0
0 0 6  4 22 22 2 5 0
0 4 6  2  2 29 6 0 0
0 2 0  2  2  2 6 0 4
0 0 0  0  2  2 2 2 0
```

The average number of bits per macroblock is 3.77, a significantly larger number than that associated with "background." The matrix after thresholding in this case would appear as follows:

```
0 0 0 10 21 15 0 0 0
0 0 0  4  0  0 0 0 0
0 0 0 22 16 18 4 0 0
0 0 0 14  0  4 0 0 0
0 0 6  4 22 22 0 5 0
0 4 6  0  0 29 6 0 0
```

-continued

```
0 0 0 0 0 0 6 0 4
0 0 0 0 0 0 0 0 0
```

Similarly, the run length representation contains much more data and would appear as follows:

3 10 0 21 0 15 6 4 0 2 0 2 6 22 0 16 0 18 0 4 5 14

0 2 0 4 0 2 4 6 0 4 0 22 0 22 0 2 0 5 2 4 0 6 0 2

0 2 0 29 0 6 1 4 4 2 0 2 0 2 0 2 1 Threshold T=0.

Corresponding residual bit expenditure for Object No. 0 and Object No. 1

Residual Bit Expenditure

Object Number 0

```
0  0 0 0 0 0  0  0 0 0 0
0  0 0 0 0 0  0  0 0 0 0
0  0 0 0 0 0  0  0 0 0 0
0  0 0 0 0 0  0 13 0 0 0
0  0 0 0 0 0  0  0 0 0 0
0  0 0 8 0 0  0  0 0 0 0
0  0 0 0 0 0  0  0 0 0 0
0 16 0 0 0 0  0  0 0 0 0
0  0 0 0 0 0  0  0 0 0 0
```

Object Number 1

```
0  0 0  5  0 28  0  0 0
0  0 0 18 24 22  0  0 0
0  0 0 69 55 25 14  0 0
0  0 0 56 96 61 21  0 0
0  0 0 28  9 26 31 17 0
0 23 0  7 36  8 19  0 0
0 16 0  5 63  5 14  0 0
0  0 0  0 18 47 51 25 0
```

The average bits per macroblock associated with residuals for Object No. 0 is 0.37 and for Object No. 1 is 13.08. The respective run length representations would be as follows.

Object No. 0

40 13 20 8 20 16 20 (Threshold T=0.37)

Object No. 1

5 28 6 18 0 24 0 22 6 69 0 55 0 25 0 14 5 56 0 96 0 61 0 21 5 28 1 26

0 31 0 17 2 23 2 36 1 19 3 16 2 63 1 14 6 18 0 47 0 51 0 25 1

(Threshold T=13)

The image "Monitor from News Sequence also has been analyzed. Monitor from News Sequence (10 Frames per Second) Size 6×5

Motion Complexity Matrix $C_{mv}$

```
0 4  0  4 15 16
2 26 7 33  6 20
0 4 32  0 26 16
0 0  2  2 26 21
0 0  0  2  2  0
```

Average Bits/Macroblock = 8.86

| Monitor |
| --- |
| Matrix after thresholding |
| 0 0 0 0 15 16 |
| 0 26 0 33 0 20 |
| 0 0 32 0 26 16 |
| 0 0 0 0 26 21 |
| 0 0 0 0 0 0 |
| $N_o = 20$; $N_{sr} = 7$; $N_{mr} = 1$; $N_{lr} = 0$ |

| Residual Complexity Matrix $C_{res}$ |
| --- |
| 0 19 0 49 169 33 |
| 7 82 33 49 248 32 |
| 0 24 26 0 76 0 |
| 0 0 48 36 64 9 |
| 0 0 0 14 20 0 |
| Average Bits/Macroblock = 94.36  QP = 12 |

The first two examples shown above are descriptors for MPEG-4 objects. It can be seen that the low motion objects such as the background of the sequence "Akiyo" are very easy to distinguish from high activity objects such as the Monitor in the News sequence.

Table 1 below shows examples of spatio-temporal complexity for MPEG-2 frames. The properties of an MPEG-2 frame are usually not as homogeneous as those of MPEG-4 objects, thus a variation can be seen. However, even in the MPEG-2 case, the descriptor according to the present invention enables simple and effective clustering of spatio-temporally similar frames.

TABLE 1

| SEQUENCE | BITS PER MACROBLOCK SPENT ON MOTION | COMPLEXITY MEASURE PER MACROBLOCK |
| --- | --- | --- |
| Football (720 × 480) | 14 | 3332 |
| Cheerleaders (720 × 480) | 11.3 | 3882 |
| Sprinkle (1920 × 1080) | 30 | 4577 |
| Marching Band (1920 × 1080) | 13.8 | 4317 |

Note that the motion complexity of the larger MPEG-2 frames (as compared to objects in the MPEG-4 cases) is seemingly higher since higher resolution data gives higher motion vectors. It is therefore important to retain information as to frame size while making use of the current matching criterion. Note also that the descriptor is applicable to B-frames, as well as to I-frames, omitting the motion vector part.

The descriptors according to the present invention have been applied mainly to the MPEG-4 test set since it has readily available segmentation into objects. Since objects have more or less homogeneous properties, comparisons making use of the present descriptors regularly yield valid results. Two multi-object MPEG-4 sequences have been compared by using an object to object comparison of similarly located objects. Since the basic motion compensation information has been used for the descriptor, the results should be readily applicable to any compressed video syntax that uses block motion compensation coupled with DCT encoding of the residual. Furthermore, since un-segmented frames can also be considered to be composite objects, this approach should also apply to such frames. In that case, descriptors are developed for the sequences by treating the sequences as single objects. Since the characteristics of such "composite" objects are not homogeneous, any comparison with descriptors of individual objects is unlikely to yield valid results. However, comparisons between two sets of frame based descriptors will provide useful results.

This work has also concentrated on MPEG-1 bit rates since a target application would be multi-media databases in which the minimum expected quality is high. The work has also been principally related to full frame rates, i.e. 25 or 30 frames per second. It should be noted that the motion complexity features would change as a function of frame rate. However, it has been determined experimentally that the allocation of bits spent on the motion vectors does not change significantly, even at lower bit rates. Only the residual bit allocation is significantly affected by changes in bit rate. It has also been found that changes in rate control strategy do not significantly affect the motion properties, but do significantly change the residual information. These factors have led to a descriptor that emphasizes features based largely on motion properties. However, residual information is developed and retained because it provides different information that can be useful in certain circumstances. For example, if two objects have the same motion properties, but, with use of the same QP (Quantization Parameter), one object requires more bits for residual encoding than the other, then the former is more spatio-temporally complex than the latter. However, if the quantization step size for one object is equal to or greater than that for another object but the residual encoding bits spent for the second object are less than those for the first object, no conclusion can be drawn regarding the relative spatio-temporal complexity of the two objects. That is, the residual bit allocation does not always provide conclusive information in this regard.

Figure 1:
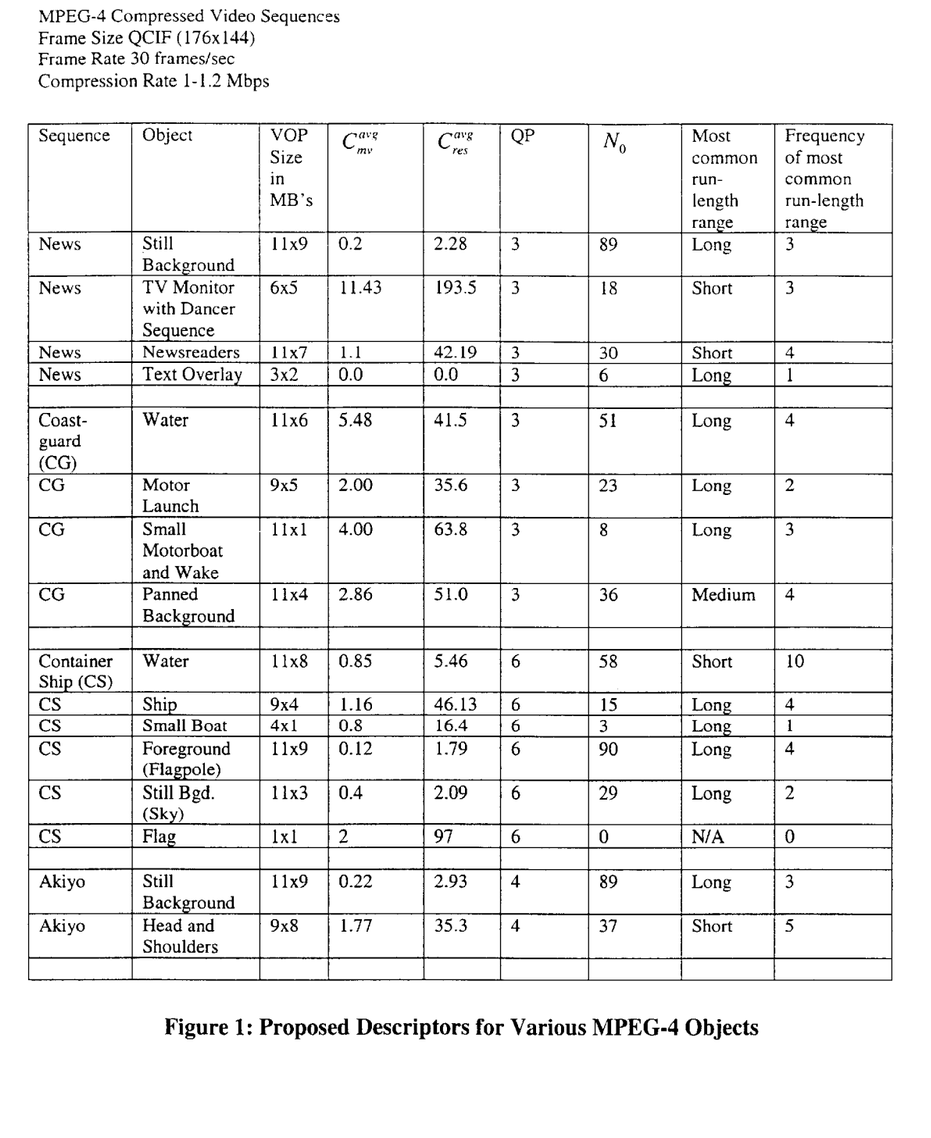
FIG. 1 is a table listing a set of MPEG-4 objects known to practitioners in the HDTV art, along with descriptors derived according to principles of the present invention, which illustrate the use of the present invention.

Typical descriptor values are shown for a commonly known set of MPEG-4 objects in FIG. 1 of the Drawing. Use of the descriptors can be illustrated by referring to this FIG. 1. The sequence of steps for using the descriptors may take several different forms and can be illustrated by two particular search procedures.

The first procedure may be identified as a "cascaded" search in which one descriptor feature at a time for the target object and all other objects are compared to successively narrow the data set. For instance, assume that in a first stage of the search in which a first feature is employed, a list of 10 objects that "match" the target is obtained from a list of 100 and, in a second search stage (a different descriptor feature) 5 "matches" are obtained from the 10 items found in the first stage, thus a cascaded search.

A second search procedure comprises using weighted combinations of the descriptor features for making comparisons. The particular weights to be given to different features involves complex considerations because of the difference in nature and scale of the features. The cascaded approach provides a more straightforward approach and is therefore preferred.

One set of features useful in a cascaded search has been found to be the sequence of $C^{thresh}_{mv}$ followed by the run-length feature set comprising $N_{sr}$, $N_{mr}$, and $N_{lr}$. The results of matching tests show that the present descriptor locates objects that are similar in motion to a target object. The first stage eliminates the candidates that are considerably different in motion characteristics, while the second stage eliminates candidates that have the same overall motion complexity but a different distribution of motion intensity. The matches sometimes are semantically quite different from the target sequence, but that is to be expected since the MPEG-2/4 based compression complexity of two semantically dissimilar objects/frames can be similar. For instance, the container ship object is close to the head and shoulders of Akiyo in motion complexity. In that case, the second stage of comparison involving run-length features usually brings semantically similar objects closer, but the difference in texture does set the ship apart from the head and shoulders image.

Such a final distinction is made in this case, since an objective of the process is to generate a short list of candidates which can then be processed further by still more sophisticated methods. The present system accomplishes the desired result.

Specific examples of first and second stage matching, using techniques according to the present invention in connection with various MPEG-4 Objects are shown in Tables 2, 3 and 4 below.

TABLE 2

First Stage Matching

| Target Object and Objects in Descending Order of Similarity | Average Motion Vector Bit Expenditure per Macroblock |
|---|---|
| Akiyo-Head and Shoulders | 1.77 |
| Container Ship-Flag | 2.0 |
| Coastguard-Motor Launch | 2.0 |
| Container Ship-Ship | 1.16 |
| News-News Readers | 1.1 |
| Akiyo-Full | 0.87 |

TABLE 3

Second Stage Matching

| Target Object and Objects in Descending Order of Similarity | Most Common Run Length Category | Frequency of Most Common Run Length Category |
|---|---|---|
| Akiyo Head and Shoulders | Short | 5 |
| Akiyo Full | Short | 5 |
| Container Ship—Ship | Short | 5 |
| News—News Readers | Short | 4 |
| Flag | N/A | |

TABLE 4

| Target Object and Objects in Descending Order Of Similarity to Target Object | Average Motion Bit Expenditure per Macroblock |
|---|---|
| Akiyo -Still Background | 0.22 |
| News-Still Background | 0.2 |
| Container Ship-Foreground (Flagpole) | 0.12 |
| Container Ship-Still Background (Sky) | 0.4 |
| News-Text Overlay | 0.0 |
| Container Ship-Small Boat | 0.8 |

Thus, the present descriptor method would be useful as an intermediate MPEG-7 descriptor that could be applied by a relatively simple apparatus and would facilitate computation of higher level MPEG-7 descriptors on a smaller data set by a subsequent apparatus or program.

As a further step in employing the foregoing techniques, temporal segmentation markers may be generated and are associated with the in-put video sequence to locate and identify particular types of scene changes. Thereafter, features of the video sequence may be extracted according to the present invention.

Specific preferred arrangements for each of abrupt scene change and fade-in/fade-out scene change detection steps are described in detail in an application entitled "METHODS OF SCENE CHANGE DETECTION AND FADE DETECTION FOR INDEXING VIDEO SEQUENCES", filed previously. It should be appreciated that there is substantial opportunity for varying details of the steps for detecting scene changes without departing from the more general aspects of the present invention.

Simply stated, a preferred method of detecting scene changes comprises the following steps:

1. Locate the GOP's in which scene changes are suspected to exist by using a DC—image-based process on successive I-frames.
2. Apply the bit allocation-based criterion in each of the GOP's selected in step 1 to locate cut points.

To apply this technique to MPEG-4 compressed video, the following more detailed criteria are employed.

Since MPEG-4 is object-based, blocks representing similarly located objects in two adjacent frames are compared in the preliminary qualifying step. The temporal change in each object is measured and a weighted sum of the changes (differences) over all the objects in a frame is determined, with the weight being related to the fraction of the total frame area occupied by the object. Object changes also are detected by repeating the procedure at the object level in each shot or scene. Changes above a threshold level indicate a suspected scene change.

Since the number of bits taken to encode each object varies significantly, a fixed threshold is not suitable as it might be in MPEG-2 data. Using a fixed threshold with MPEG-4 data results in false detection and/or fails to detect scene changes at the object level. A combination of a fixed threshold and a sliding window therefore is used to ensure that the detection works at all bit rates of interest.

It should also be taken into account that frame replication is sometimes used when changing from one frame rate to another. By splitting the bit allocation bit image into two images, one corresponding to the bit allocation for motion vectors and the other corresponding to the residual, frame replication can then be detected as a sudden dip in the number of bits required to encode the motion vectors, as well as an accompanying dip in the number of bits required to encode the residual. The simultaneous dip in both parameters disqualifies this data from the scene change determination. This added refinement eliminates a false detection problem where frame replication is used.

One specific set of steps employed for abrupt scene change detection are as follows:

1. Let the test sequence S consist of frames $I_oPP \ldots I_1PP \ldots I_3 \ldots$
2. Form a sub-sequence $S_1$ consisting of the I-frames $I_oI_1 \ldots$
3. Carry out scene change detection of $S_1$ using the DC image based criterion. That is, for each macroblock, determine a DC value equal to ¼ the sum of the DC values for each 8×8 block in the macroblock, compare temporally adjacent macroblocks and determine a potential scene change when any difference is greater than a selected threshold value. While comparing frames, compare the object occupying the closest corresponding space in the frame, and if the objects being compared are of different sizes, obtain the best match between the two objects to compute the difference criterion by using a motion-estimation-like process. Let the area of each object $O_f$ be $A_f$, its difference criterion be di and the difference criterion corresponding to frame n be $D_n$. Then the total criterion will be:

$$D_n = \frac{\sum_i A_i * d_i}{\sum_i A_i}$$

4. From the previous step identify pairs $I_m$, $I_{m+1}$ that have a suspected scene change. Let the corresponding GOP's be $G_{test[1]}$, $G_{test[2]}$ ...
5. For each GOP from the previous step carry out scene change detection using:
   (a) P frame to P frame comparison using bits per macroblock criterion;
   (b) If no scene change is detected in the previous step, let the GOP previous to the tested GOP be $GOP_{prev}$ and the GOP succeeding the tested GOP be $GOP_{next}$. Then take the last P frame of $GOP_{prev}$ and compare it with the P frame of $GOP_{next}$, using the bits per macroblock criterion, and similarly take the last P frame of the tested GOP and compare it with the first P frame of $GOP_{next}$. If a scene change is detected, declare scene change at corresponding I-frame or else declare failure of bit allocation based algorithm. If the algorithm fails, use alternative technique such as DC image-based algorithm.
6. Segment S into shots based on above scene change detection.
7. In the MPEG-4 case, repeat the same procedure within each shot to detect abrupt object changes.

The Bit Allocation Based Criterion

For each object, construct a "bit rate matrix" which consists of the number of bits required to encode each macroblock. Let $R=\{r(i,j)\}$ and $S=\{s(i,j)\}$ be two rate matrices, then the rate difference between R and S is $$d(R, S) = \sum_{i,j} |r(i, j) - s(i, j)|$$

where $r(i,j)$ is the number of bits required by the $(i,j)^{th}$ macroblock of the object. Given a sequence of rate matrices $R_m$, m=1,2, ... N+1, we can obtain the normalized rate difference sequence $RP_m$, m=1,2, ..., N as $$RP_m = \frac{d(R_m, R_{m+1})}{T_m}$$

where $T_m$ is the total number of bits required by the $m_{th}$ object of the sequence $RP_m$. Use a sliding window to process the rate difference sequence $RP_m$ so as to capture local variation. Declare a scene change from $R_i$ to $R_{i+1}$ if
1. The difference $RP_1$ is the maximum within a symmetric sliding window of size 2k-1 and
2. The difference $RP_t$ is also n times the second largest maximum in the sliding window. k=3 and n=2 are used in the examples that are illustrated. The choice of these parameters depends on empirical data as well as frame rate, the frequency of periodic I-frames, etc. Note that the rate difference can be computed only between two I frames/objects or between two P frames/objects. In other words, all the frames in the sequence $R_i$ should all be either I or P frames (objects). Note also that in an MPEG-4 sequence, all the objects need not necessarily be "refreshed" with intra-coding at the same time.

DC Sequence Based Criterion

In this approach, a sequence of DC images (objects) $X-\{dc(i,j)\}$ is constructed where $dc(i,j)$ is the DC value of the $(i,j)^{th}$ macroblock of the image (object). Extraction of DC values from Intra coded frames or objects is simple since it only requires entropy decoding, but extraction of DC values from Predictive and P frames/objects requires more computation and memory. Thereafter, a difference sequence is constructed as in the previous sequence using one of several possible metrics. The metric ($d_c(X,Y)$ is used between two frames X and Y as defined below:

$$d_c(X, Y) = \sum_{i,j} (|x_{i,j} - y_{i,j}|)$$

One can therefore construct a sequence $d_c(X_i, Y_{i+1})$ for the sequence and use the previously described sliding window approach to detect scene changes.

Fade Detection Using Changes in Bits Taken to Encode DC Components of Residuals

It has been observed that, when there is a gradual scene change, every block of the image includes a DC correction term, since the image is fading in from a completely black frame or fading out to a completely black frame. With this in mind, it has been found that bit allocation profiles for DC components of residual blocks provide an indicator for fade detection. A method of fade detection which is described in greater detail in a second concurrently filed application of the present inventors generally comprises the following steps.
1. Compare the DC images of successive I-frames to locate suspected scene changes. This has been found to be necessary for the method of detecting abrupt scene changes as described above. This step helps save computation, since a search is made thereafter for a scene change only in the signal segments in which successive I-frames differ widely, thus avoiding processing the entire signal sequence.
2. For each P-frame in the regions in which there is a suspected scene change, the number of blocks with negative DC components as well as the number of blocks with positive DC components are counted. For the MPEG-2 as well as the MPEG-4 case, this step is readily accomplished from the VLC parsing, since every non-zero DC component will be allocated a non-zero number of bits and a sign bit that indicates whether the component is positive or negative. Zero DC components are indicated by the run-lengths and thus can be readily skipped.
3. Determine the characteristic of the two numbers obtained above versus the frame number, and determine the regions in which suspected scene changes have been located according to step 1 above.
4. Declare a fade-out if the number of negative transitions is consistently greater than or equal to 60% of the total number of non-zero transitions. Conversely, declare a fade-in if the number of positive transitions meets the aforementioned threshold. It should be noted that a version of a sliding window may be used in place of the stated 60% threshold.

This detection scheme capitalizes on the motion search carried out by the encoder. It measures the rate spent on encoding the DC difference between a particular macroblock and its closest match in the previous frame.

To summarize, descriptors are constructed based on the number of bits required for encoding the motion vectors and the residuals of each macroblock in the object/frame.

The motion vector and residual compression complexity matrices are made as independent of the bit rate as possible.

The average number of bits spent on motion vectors per macroblock of the frame/object can be calculated. This average is a useful additional measure of the motion complexity of the frame/object. At low bit rates with MPEG-4, this average provides an easy distinction between still and moving objects. Similarly calculate the average compression complexity of the residual per macroblock of the frame/object. This number helps classify/match objects/frames. Represent the two matrices using run-lengths. This is especially useful at low bit rates which force many elements to be zero. A scan order is used for convenience, but any other order can be used. The run-length structure is used to express the shape of the spatial distribution of the compression complexity in a simple way. A thresholding function is provided prior to the run-length representation, in which all elements lower than a specified threshold T are set to zero. The threshold is supplied as part of the descriptor.

A descriptor is thereby developed for each frame of a sequence. A descriptor for a shot is determined by first segmenting the video sequence temporally into shots, using scene change detection techniques as described above. Use the frame descriptor of the frame of the shot which falls within a group of frames around an average as the descriptor for the shot. The first few frames may be skipped to let the rate control settle down from a scene transition.

The average bit expenditure on motion vectors per macroblock, as well as the average compression complexity per macroblock can serve as matching criteria that help rank the candidates. The run-length information in each representation then can be used to further rank the candidates. Thereafter, equally indexed run-lengths are compared, i.e. compare the run-lengths of short, intermediate and long lengths of frame/object A with the corresponding run-lengths of frame/object B The invention has been described in terms of matching of single shots from diverse program sources. However, it should be recognized that it is within the scope of the present invention to apply the foregoing techniques to collections of shots, each collection coming from a single program source. For example, an action movie would have several high motion-complexity shots in a row while a more sedate movie would have a number of low spatio-temporal complexity shots in a row. These characteristics could be logged and used to provide matching criteria.

It should also be noted that the sequence of steps as set forth above do not necessarily occur in close time proximity to each other but may, in fact, be separated in time. In particular, the descriptor can be developed and attached to the program material and, at a later time, it may be used to find matches. In any event, such activities are considered to be within the scope of the present invention.

Thus, while the present invention has been described in terms of a preferred embodiment and various modifications thereof, it will be understood by those skilled in this art that additional modifications may be made without departing from the scope of this invention which is set forth in the accompanying claims.

What is claimed is:

1. A method for identifying a frame, comprising the steps of:

determining the number of bits in the compressed bit stream associated with a first inter-coded frame represented in a compressed bit-stream corresponding to a video sequence having intra-coded frames and inter-coded frames, the compressed bit-stream including a number of bits associated with each of the inter-coded frames representing a displacement from the associated inter-coded frame to a closest matching of the intra-coded frames; and identifying the first inter-coded frame based on the determined number of bits.

2. A method according to claim 1, wherein the frame is an object, the intra-coded frames are intra-coded objects, the inter-coded frames are inter-coded objects, and the first inter-coded frame is a first inter-coded object.

3. A method according to claim 1, wherein the determined number of bits are indicative of one of (i) a scene change within the first inter-coded frame and (ii) an object within the first inter-coded frame and not in an immediately preceding one of the intra-coded and the inter-coded frames.

4. A method according to claim 1, wherein the bits are first bits, the compressed bit-stream further includes a number of second bits associated with each of the inter-coded frames representing a difference between information within the associated inter-coded frame and information within the closest matching intra-coded frame, and further comprising the steps of:

determining the number of second bits in the compressed bit stream associated with the first inter-coded frame; and determining the spatio-temporal compression complexity of the first inter-coded frame based upon the determined number first bits and the determined number of second bits;

wherein the first inter-coded frame is identified based upon the determined complexity.

5. A method according to claim 4, further comprising the step of:

entropy decoding the compressed bit stream;

wherein the number of first bits and the number of second bits in the compressed bit stream associated with the first inter-coded frame is determined from the entropy decoded compressed bit stream.

6. A method according to claim 4, wherein the first inter-coded frame includes a plurality of macro-blocks, each of the macro-blocks is associated with a respective portion of the determined number of the first bits and a respective portion of the determined number of the second bits, and further comprising the step of:

generating a descriptor including a first compression complexity matrix including values representing the respective portions of the determined number of first bits associated with the plurality of macro-blocks and a second compression complexity matrix including values representing the respective portions of the determined number of second bits associated with the plurality of macro-blocks;

wherein the spatio-temporal compression complexity of the first inter-coded frame is determined based on the generated descriptor.

7. A method according to claim 6, wherein the number of second bits associated with each of the plurality of macro-blocks is the same.

8. A method according to claim 6, wherein:
generating the descriptor includes averaging the values representing the respective portions of the determined number of first bits associated with the plurality of macro-blocks; and
the generated descriptor includes the average value.

9. A method according to claim 1, wherein:
the first inter-coded frame includes a plurality of macro-blocks;
each of the macro-blocks is associated with a respective portion of the determined number of bits; and
the determined number of bits is an average number of bits per macro-block which is computed based on the respective portions of the determined number of bits associated with each of the plurality of macro-blocks included in the first inter-coded frame.

10. A method according to claim 9, wherein the bits are first bits, the compressed bit-stream further includes a number of the second bits associated with each of the inter-coded frames representing a difference between information within the associated inter-coded frame and information within the closest matching intra-coded frame, and further comprising the steps of:
determining the number of second bits in the compressed bit stream associated with the first inter-coded frame, each of the macro-blocks being associated with a respective portion of the determined number of second bits; and
computing an average number of second bits per macro-block based on the respective portions of the determined number of second bits associated with each of the plurality of micro-blocks included in the first inter-coded frame;
wherein the first inter-coded frame is identified based upon the computed average number of first bits and the computed average number of second bits.

11. A method according to claim 9, further comprising the steps of:
setting the number of bits associated with each of the plurality of macro-blocks to zero if the number of bits associated with that macro-block is less than a threshold; and
determining a value corresponding to run lengths of those of
the plurality of macro-blocks having the number of bits set to zero;
wherein the first inter-coded frame is further identified based upon the determined value corresponding to the run lengths.

12. A method according to claim 11, wherein the threshold is the computed average number of bite.

13. A method according to claim 12, wherein the value corresponding to run lengths is one of a plurality of values corresponding to run lengths of those of the plurality of macro-blocks having the number of bits set to zero, the sum of the plurality of values is equal to a total number of macro-blocks in the plurality of macro-blocks having the number of bits set to zero, and further comprising the steps of:
categorizing each of the run lengths in one of a plurality of categories, each of the plurality of categories corresponding to a different run length range; and
determining a value corresponding to the run lengths within each of the plurality of categories;
wherein the first inter-coded frame is further identified based upon the determined value corresponding to run lengths in each of the plurality of categories.

14. A method for identifying a frame, comprising the steps of:
identifying at least a first inter-coded frame and a second inter-coded frame in a compressed video bit-stream, wherein (i) the compressed video bit-stream corresponds to a video sequence having intra-coded and inter-coded frames, each of the inter-coded frames having a plurality of macro-blocks, the compressed bit-stream including a number of bits associated with each of the inter-coded frames representing a displacement from the associated inter-coded frame to a closest matching of the intra-coded frames, a respective portion of the number of bits being associated with each of the plurality of macro-blocks of that inter-coded frame and corresponding to a number of run lengths representing those of the plurality of macro-blocks of that inter-coded frame having the associated respective portion of the number of bits equaling less than a threshold, and (ii) the first and the second inter-coded frames are identified based on the number of bits associated with the first inter-coded frame and the number of bits associated with the second inter-coded frame; and
identifying only the first inter-coded frame of the identified at least first and second inter-coded frames based on the number of run lengths associated with the first inter-coded frame.

15. A method according to claim 14, wherein:
the number of run lengths associated with the first inter-coded frame is one of multiple numbers of run lengths associated with the first inter-coded frame;
each of the multiple numbers of run lengths is within one of multiple run length ranges; and
the first inter-coded frame is identified based on the number of run lengths within each of the multiple run length ranges.

16. A method according to claim 14, wherein the number of bits is an average number of bits per macro-block.

17. A method according to claim 14, further comprising the step of:
comparing a frequency of occurrence of the number of the run lengths associated with the first inter-coded frame with a frequency of occurrence of the number of the run lengths associated with the second inter-coded frame;
wherein the first inter-coded frame is identified based on a difference between the frequency of occurrence associated with the first inter-coded frame and the frequency of occurrence associated with the first inter-coded frame.

18. A descriptor, stored on a computer readable memory, for identifying a frame, comprising:
a number of bits of a compressed bit stream corresponding to a video sequence having intra-coded frames and inter-coded frames, each of the inter-coded frames including a plurality of macro-blocks, wherein the number of bits are associated with the plurality of macro-blocks of one of the inter-coded frames and represent a displacement from the one inter-coded frame to a closest matching of the intra-coded frames; and
a value corresponding to run lengths of those of the plurality of macro-blocks of the one inter-coded frame having less than a threshold number of the associated bits.

19. A descriptor according to claim 18, wherein:
each of the plurality of macro-blocks of the one inter-coded frame has an associated respective portion of the bits; and the number of bits is an average number of bits in the respective portions of bits associated with each of the plurality of macro-blocks of the one inter-coded frame.

20. A descriptor according to claim 19, wherein the threshold is the average number of bits.

21. A descriptor according to claim 18, wherein the bits are first bits, and further comprising:

a number of the second bits associated with the one inter-coded frame representing a difference between information within the one inter-coded frame and information within the closest matching intra-coded frame.

22. A descriptor according to claim 21, wherein:

each of the plurality of macro-blocks of the one inter-coded frame has an associated respective portion of the second bits; and the number of second bits is an average number of the second bits in the respective portions of second bits associated with each of the plurality of macro-blocks of the one inter-coded frame.

23. A descriptor according to claim 18, wherein the value corresponding to run lengths is a first value corresponding to the run lengths within a first range, and further comprising:

a second value corresponding to the run lengths of those of the plurality of macro-blocks having less than a threshold number of the associated bits and within a second range different than the first range.

* * * * *